Nov. 29, 1927.
J. P. BLASS
1,651,318
SAFETY PIN FOR BRAKE LEVERS AND RODS
Filed Dec. 4, 1926
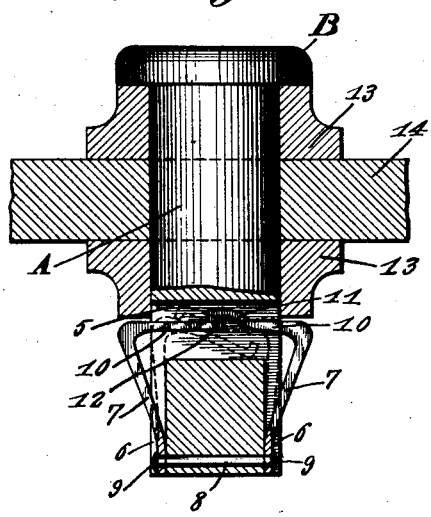
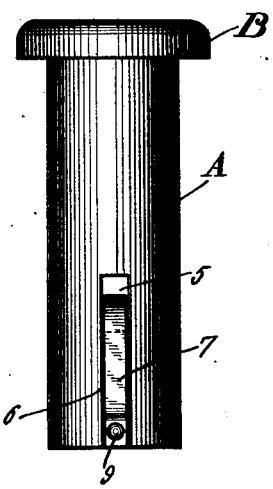
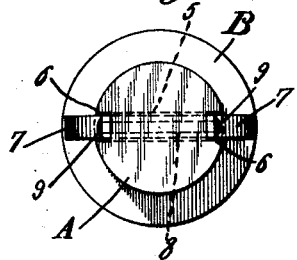
John P. Blass, INVENTOR.
BY
Geo. P. Kimmel ATTORNEY.

Patented Nov. 29, 1927.

1,651,318

UNITED STATES PATENT OFFICE.

JOHN P. BLASS, OF NEW ORLEANS, LOUISIANA.

SAFETY PIN FOR BRAKE LEVERS AND RODS.

Application filed December 4, 1926. Serial No. 152,710.

The invention relates to a self-fastening pin for use with brake levers and rods and more especially to the class of safety pins or brake lever and rod connections or the like.

The primary object of the invention is the provision of a safety pin of this character, wherein the same is self locking when connecting parts together, the pin being designed more especially for use in connecting brake levers and rods for railway freight and passenger cars, although the same is adaptable for use on automobiles or any other vehicles for removably connecting parts together, the pin being of novel construction to permit the ready and convenient application thereof and when in position will be locked against accidental removal, thus eliminating the use of cotter pins or other like fasteners for securing the pin in place.

Another object of the invention is the provision of a safety pin of this character, wherein the construction thereof is of novel form, so that it can be readily placed in position for connecting parts and removed therefrom for further use and when in position will be firm and secure, without liability of accidental removal or detachment, yet such pin can be readily removed with dispatch, without requiring the use of tools or other implements, as the same is manually operable.

A further object of the invention is the provision of a pin of this character, wherein the locking means is a unitary part thereof and will automatically lock itself when connecting parts to avoid any possibility of the accidental removal of the pin with resultant liability of the separation of the connected parts.

A still further object of the invention is the provision of a pin of this character, which is extremely simple in construction, thoroughly reliable and efficient in its purpose, strong, durable, and inexpensive to manufacture and install.

With these and other objects in view, the invention consists in the features of construction, combination and arrangement of parts, as will be hereinafter more fully described in detail, illustrated in the accompanying drawing, disclosing the preferred embodiment of the invention, and pointed out in the claims hereunto appended.

In the accompanying drawing:

Figure 1 is a fragmentary sectional view through several parts to be connected, showing the safety pin applied, constructed in accordance with the invention, a portion of the pin being broken away to show the self locking device thereof.

Figure 2 is a side elevation of the safety pin removed from the parts.

Figure 3 is an inner end elevation of the pin.

Similar reference characters indicate corresponding parts throughout the several views in the drawing.

Referring to the drawing in detail, in carrying the invention into practice, there is provided a pin A, which is of cylindrical form throughout its length, provided at one end with a circular head B, it being understood, of course, that the head may be otherwise formed and the shape thereof varied as occasion may require. It is also to be understood that the length of the pin can be varied according to the character of work parts with which the same is to be associated.

The pin A remote from the head B is provided with an elongated substantially rectangular shaped passage 5 disposed crosswise of the pin and opening through diametrically opposite points thereof, while in alignment with this passage longitudinally of the pin A are diametrically opposed grooves or channels 6, these opening through the free end of the pin A opposite the head B thereof.

Adapted to work in these grooves or channels 6 is a duel-fastener or locking device which comprises a pair of resilient members constituting legs 7, which at their outer ends are anchored within the grooves or channels 6 through the medium of a cross securing rivet 8 which passes transversely through the pin A close to the free end thereof, the rivet 8 being upset at opposite ends to form heads 9, thus firmly securing the legs 7 to the pin A as is clearly illustrated in Figure 1 of the drawing.

The legs 7 which possess inherent resilient qualities are normally disposed in divergent relation to each other in the direction of the head B of the pin A and are formed with inturned jaws 10. One of the jaws 10 is deformed to provide an overhanging hook like terminal 11 relative to the other jaw 10, which is straight and provided with an outturned terminal abutment 12 adapted to cooperate with the hook extremity 11, so that the members of the locking device will be limited in their spreading relation to each other, but will be free to be compressed to come entirely within the grooves or channels 6 in the pin A. These jaws 10 work freely within the passage 5 transversely in the pin and the normal position of the members of the locking device are shown by full lines in Figure 1 of the drawing, while by dotted lines the members are shown in compressed position, the latter position permitting the pin A to be withdrawn from the parts with which the same is associated for connecting them. When the members of the locking device are extended they will lock the pin and the parts with which it is associated. To exemplify the use of the pin A there has been illustrated parts 13 and 14 in Figure 1 of the drawing through which said pin A has been passed and is locked in such position. It is, of course, understood that to permit the removal of the pin A from the parts 13 and 14 it is only necessary to manually compress the members constituted by the legs 7 and jaws 10 of the locking device, so that these members will pass into the grooves or channels 6 in the pin 5 to clear the parts 13 and 14, whereupon such pin A can be readily withdrawn therefrom.

It is also apparent that the pin can be readily inserted through the parts 13 and 14 and will be automatically locked therein when the members of the locking device expand to the position shown in Figure 1 of the drawing, so that if end thrust on the pin occurs lateral outward movement of the members 7 of the locking device will be effected, and concurrently therewith the interlocking of the jaw 10 and extremity 11 will take place, thus rendering the locking device fixed against undue outward spreading of its members, without any liability of possible release of the pin A.

From the foregoing it is thought that the construction and manner of use of the device will be clearly understood and therefore a more extended explanation has been omitted.

What is claimed is:—

1. The combination of a pin having a transverse passage intermediate its ends and opposed channels longitudinally disposed and merging into the passage and opening through one end of the pin, and a pair of normally expanded resilient latching members anchored to the pin to work within the channels and having the terminals engaging and confined within the passage.

2. In a device of the character described, the combination with a pin having a head at one end and also provided with a transverse passage and opposed channels merging into the passage and opening through the opposite end of said pin, of a pair of latching members disposed in divergent relation to each other in the direction of the head and having inturned portions confined within the passage, an offset hook terminal on the free end of one of the members, an abutment on the free end of the other member and cooperating with the hook terminal, and means for anchoring the members to the pin within the channels therein.

3. The combination of a pin, and a pair of opposed resilient members carried thereby and normally projected beyond the surface of the shank of the pin at its free end and having their free terminals engaging with each other when subjected to outward lateral movement by end thrust of the pin.

4. In combination, a pin having a transverse passage intermediate its ends, and opposed normally expanded resilient members anchored to the pin, and interengaging terminals on the members remote from the point of anchorage thereof with the pin and confined within the transverse passage for positive engagement with each other when resisting outward lateral movement by end thrust of the pin.

5. The combination with a pin, of resilient members carried at opposite sides of the pin and normally disposed in divergent relation to each other to be extended beyond the surface of the pin, and means formed from the members for positive engagement with each other upon lateral movement of the members imparted thereto by end thrust of the pin.

6. The combination with a pin, of resilient members carried at opposite sides of the pin and normally disposed in divergent relation to each other to be extended beyond the surface of the pin, and means formed from the members for positive engagement with each other upon lateral movement of the members imparted thereto by end thrust of the pin, said pin being constructed to confine the interlocking means within the same.

In testimony whereof, I affix my signature hereto.

JOHN P. BLASS.